May 29, 1956     J. P. LANNEN     2,747,411

METHOD AND MACHINE FOR TESTING UNIVERSAL BALANCE

Filed July 22, 1952     3 Sheets-Sheet 1

INVENTOR.

JOSEPH P. LANNEN

BY J. S. Murray

ATTORNEY

May 29, 1956  J. P. LANNEN  2,747,411
METHOD AND MACHINE FOR TESTING UNIVERSAL BALANCE
Filed July 22, 1952  3 Sheets-Sheet 2
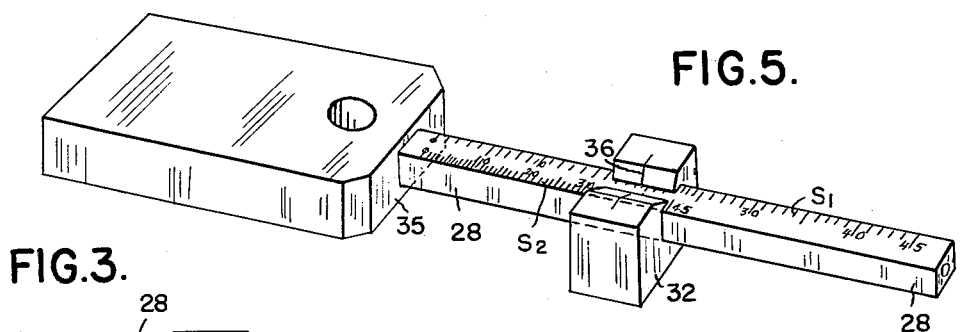
FIG.5.
FIG.3.
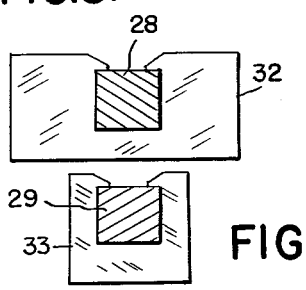
FIG.4.
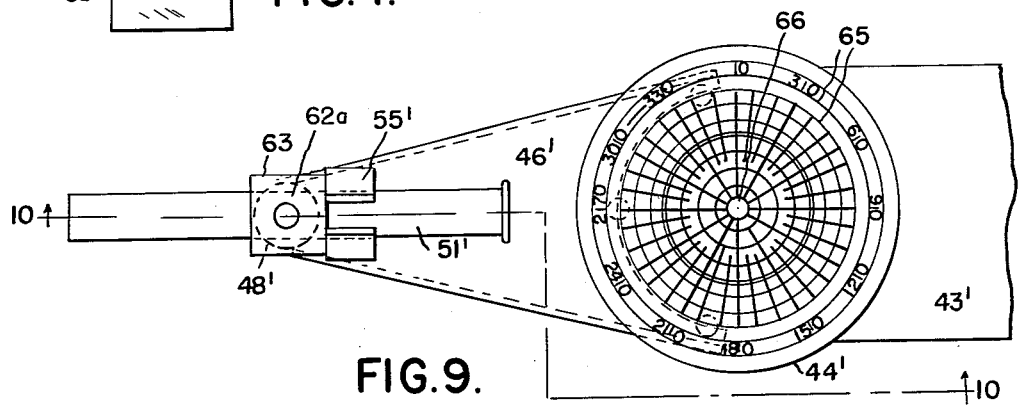
FIG.9.
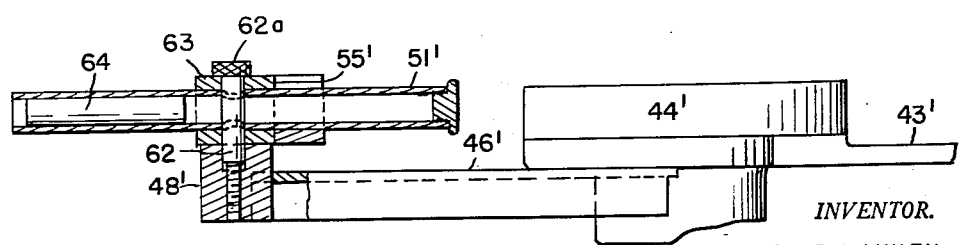
FIG.10.
INVENTOR.
JOSEPH P. LANNEN
BY
J.S. Murray
ATTORNEY May 29, 1956      J. P. LANNEN      2,747,411
METHOD AND MACHINE FOR TESTING UNIVERSAL BALANCE
Filed July 22, 1952      3 Sheets-Sheet 3
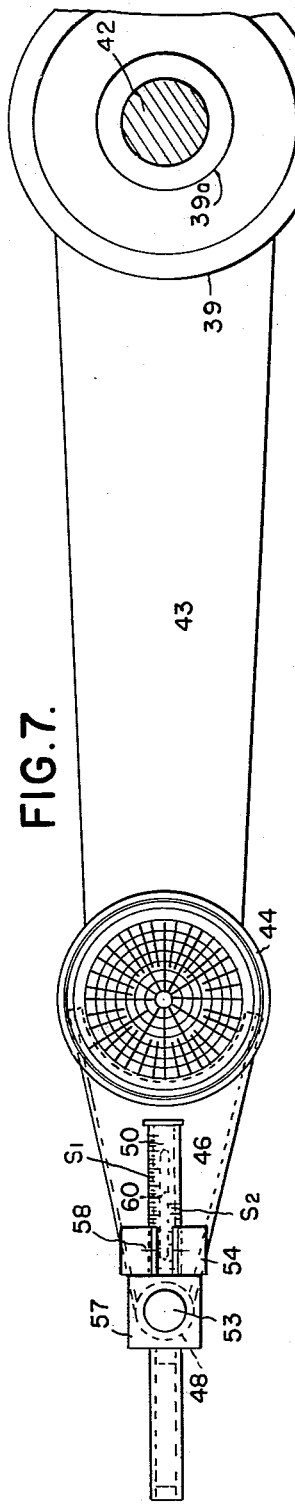
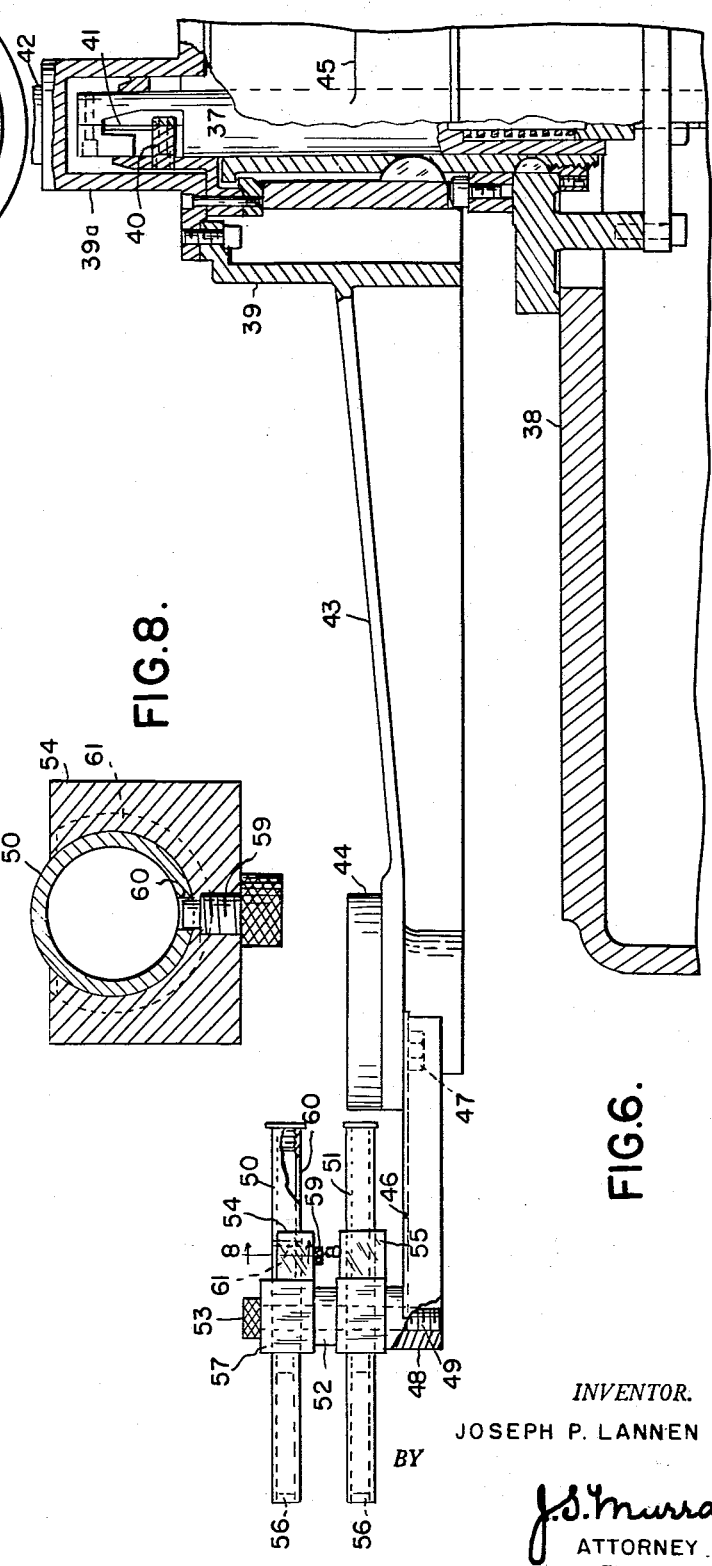
*INVENTOR.*
JOSEPH P. LANNEN
BY
ATTORNEY

United States Patent Office 2,747,411
Patented May 29, 1956

2,747,411

METHOD AND MACHINE FOR TESTING UNIVERSAL BALANCE

Joseph P. Lannen, Detroit, Mich., assignor to Micro-Poise Engineering and Sales Company, Detroit, Mich., a partnership Application July 22, 1952, Serial No. 300,261

14 Claims. (Cl. 73—483)

This invention relates to methods and machines for testing work-pieces as to universal balance and for indicating the amount and direction of any moment inducing unbalance. Such machines are useful in testing tires, propellers, turbine wheels, flywheels, and many other parts. In conducting a test, the work seats on a universally pivotal carrier, and any inaccuracy in functioning of the carrier has heretofore entailed an error in unbalance indications. Inaccurate performance of the carrier may have various causes such as undue friction, inadvertent lodgment of weight on the carrier, or excessive air currents. Consequently it has heretofore been necessary to frequently check the described machines for accuracy, and some repetition of tests has been necessitated, following the discovery and correction of a defect in carrier performance.

An object of the invention is to provide a method and machine affording compensation for any error in carrier performance in the course of testing each work-piece.

Another object is to equip a work carrier of the above-described character with certain weights, and to compensate for erroneous functioning of the carrier by an adjustment of such weights supplemented by a rotative shifting of the work on the carrier.

Another object is to cancel out inaccuracy in the functioning of a universally pivoted work carrier by a method including a rotation of the work through substantially one hundred and eighty degrees about its intended axis of balance.

Another object is to copivotally install on said pivotal carrier two beams each equipped with a sliding weight, adjustment of one such weight serving to bring the carrier and its load to balance in the initial position of a work-piece on the carrier, and adjustment of the other weight serving a like purpose after rotating said piece through substantially one hundred and eighty degrees.

Another object is to provide one of said beams with two scales of graduations, facilitating such location of a weight on the beam as will bisect the leverage previously exerted by the weight.

These and various other objects are attained by the construction hereinafter described and illustrated in the accompanying drawings, wherein.

Figure 1:
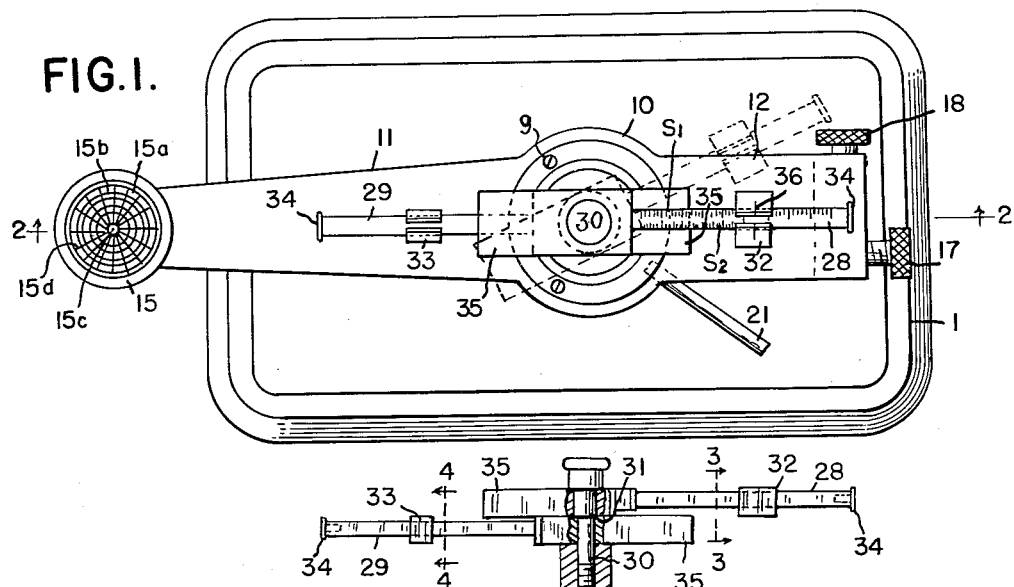
Fig. 1 is a top plan view of a balancing machine incorporating my improved construction.
Figure 2:
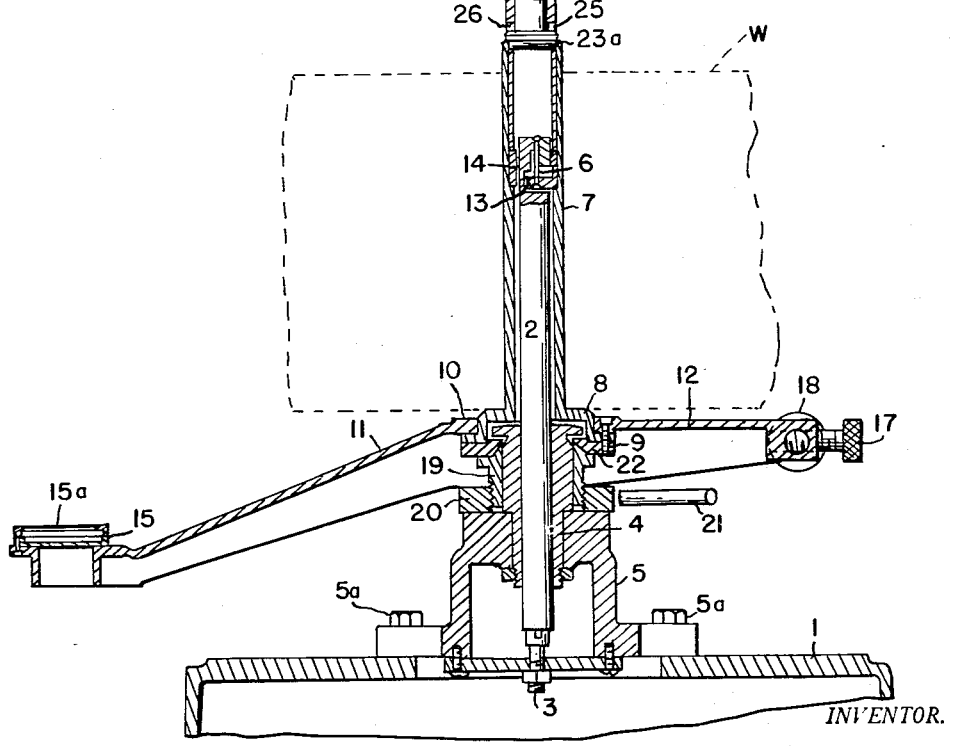
Fig. 2 is a sectional elevational view of the machine, taken on the line 2—2 of Fig. 1.

Figs. 3 and 4 are respectively cross sectional details of certain weighing beams which the machine employs, the sections being taken respectively on the lines 3—3 and 4—4 of Fig. 2.

Fig. 5 is a perspective view of the uppermost of said beams.

Fig. 6 is a fragmentary sectional elevation of my invention applied in a modified form to a balancing machine.

Fig. 7 is a fragmentary top plan view of the construction appearing in Fig. 6.

Fig. 8 is a cross sectional detail of a weighing beam and weight thereon, taken on the line 8—8 of Fig. 6.

Fig. 9 is a fragmentary top plan view of a further modification.

Fig. 10 is a sectional elevation of the last-mentioned modification, taken on the line 10—10 of Fig. 9.

Referring first to that form of the invention illustrated in Figs. 1–5, the reference character 1 designates a base which mounts an elongated upstanding accurately vertical pin 2. It is preferred to seat such pin on a headed screw 3 threaded in the base and affording a slight vertical adjustment of the pin. A lower portion of the described pin is set into a bushing 4 centrally inserted in a pedestal 5 fixed on the base as by bolts 5a. Universally pivoted at 6 on the upper end portion of the pin 2 is a work carrier comprising a hollow spindle 7, normally coaxial with and spaced outwardly from the pin to afford a limited swinging of the carrier on the universal pivot. Said spindle has an annular enlargemet 8 at its lower end, forming a work seat. Fixed on said enlargement by bolts 9 is an annulus 10 integrally interconnecting oppositely projecting arms 11 and 12. Thus the described pivotal work carrier comprises parts 7, 8, 9, 10, 11 and 12. The universal pivot 6 comprises a short flexible length of normally vertical wire, having its upper and lower ends respectively rigidly secured to the upper end of the post and to a lug 13 projecting into the post from a collar 14 fixed on and within the spindle. A more detailed disclosure of the described universal pivot may be found in my Patent 2,349,288, issued May 23, 1944. The outer portion of the arm 11 mounts a universal level 15 illustrated as of a liquid and bubble type, such level including a transparent dial 15a so marked with a set of concentric circles 15b that unbalance of the carrier in ounce inches is indicated by outward travel of the bubble 15c from its normal location at the axis of said circles. Radial markings 15d on said dial indicate, in correlation with the bubble, the direction in which unbalance takes effect. A more complete disclosure of such a universal level may be found in my Patent 2,240,337, issued April 29, 1941. The arm 12 terminally carries two screws 17 and 18, respectively adjustable lengthwise and transversely of such arm, such screws having heads proportioned to serve as weights whose adjustment affords universal balancing of the carrier, at initial installation of the machine.

In applying a load W to the described carrier or in manipulating an applied load, it is desirable to relieve the universal pivot of the considerable stresses which may otherwise be imposed by such operations. To afford such relief, a colar 19 slidable on the bushing 4 above the pedestal 5 is exteriorly threaded for engagement by a ring 20 seated on said pedestal and rotatable by an elongated handle or lever arm 21. A fractional turn of said ring will predeterminedly lift or lower the collar 19. When the collar is lifted it engages a thrust ring 22 attached to the carrier by the bolts 9, the carrier being thus slightly raised from its balancing position and avoiding load reaction on the pivot 6. When the collar is lowered, it sufficiently clears the ring 22 to afford the intended pivotal play of the carrier.

As so far described, the machine will accurately indicate the amount and direction of unbalance in a piece of work, provided the carrier itself maintains an accurate universal balance. As hereinbefore stated, however, conditions arising from time to time tend to disturb the required precision balance of the carrier. There will now be described a compensator installed on the carrier, and a method of manipulating such compensator and any work-piece, in testing the latter, whereby carrier inaccuracy is eliminated as a factor in deriving final indications from the universal level. Screwthreaded firmly into the upper end of the spindle 7 is the enlarged lower end 23a of a stud 23 forming a reduced upward extension of the spindle. A compensator mounting 24 has its lower end socketed to slipfit on the stud. Rotation of the mounting relative to the spindle is prevented by a pin 25 upstanding on the stud enlargement 23a and received in one of several notches 26 formed in the mounting. Coaxially but independently swiveled on and above the mounting 24 are upper and lower weighing beams 28 and 29, their swivel axis being the extended axis of the spindle 7. The swiveling means for the beams is preferably a post 30 having its lower portion set into and threaded in the mounting 24. Said post has upper and lower portions respectively mounting the respective upper and lower beams, the diameter of said upper portion slightly exceeding that of the lower portion, whereby there is formed a shoulder 31 which by reason of the screw threads may be clamped upon the lower beam to lock such beam in a selected position of swivel travel. The post is headed above both beams for applying the slight rotation requisite to clamp or unclamp the lower beam.

Weights 32 and 33 are slidable respectively on the upper and lower beams, the upper weight being preferably about twice the size of the lower one for reasons which will presently appear. Escape of the weights is prevented by the heads 34 of the screws set into the outer ends of the beams. The slideway portion of each beam is at one side of the post 30, such portion rigidly projecting from an enlarged counterbalancing portion 35 engaged by said post and forming a stop for inward travel of the corresponding sliding weight. The arrangement is such that when the sliding weight of either beam is at its inner limit of travel, such weight and the slideway portion of the beam are accurately counterbalanced by the enlarged portion 35 of the beam. The upper beam is marked on its top face with two scales, $S_1$ and $S_2$. These may be graduated in inches and fractions thereof or any other desired units of length, it being requisite however that the units of the scale $S_2$ be precisely one half those of the scale $S_1$, the scale $S_1$ thus having twice the length of the scale $S_2$. The scales include figures indicating outward travel of the sliding weight 32, these figures being the same for both scales. Thus by shifting said weight from any position numerically shown on the scale $S_1$ to the same numerical position on the scale $S_2$, the distance of such weight from the coincident zero points of the two scales is reduced by one half. Each sliding weight has index marks 36 for alignment with selective markings of the two scales.

In use of the described machine, the compensator 24, 28, 29, 30, 32, 33, 34, 35 is removed during slip-fitting of a work-piece W upon the spindle 7, and is then replaced, the weights 32 and 33 being set at zero. In applying a workpiece, the pivot wire 6 is relieved of load by so rotating the ring 20 as to raise and load the collar 19. Upon again lowering such collar, the carrier and its load are free to tilt, the degree of tilting being determined by unbalance of the workpiece plus or minus any unbalance affecting the carrier. The amount and direction of bubble deflection is now noted on the dial, and the lower beam 29 is swung to overhang the lighter half of the work, the directional indication afforded by the dial aiding materially in swiveling such beam to its proper position. The weight 33 is now outwardly shifted on the lower beam until the bubble returns to the dial center, indicating a full correction for unbalance. The lower beam is now clamped in its adjusted position by screwing the post 30 slightly downward. After again raising the collar 19 and thus unloading the pivot wire, the operator shifts the work on the carrier rotatively about the spindle 7 through substantially one hundred and eighty degrees. The collar 19 is then lowered, allowing the universal pivot to again function. Resultant tilting of the loaded carrier is induced by twice the unbalance of the work, being due to the previous shifting of the weight 33 in excess of the amount necessary to balance the carrier plus actual unbalance of the work. The operator now swively adjusts the upper beam and shifts the weight 32 outward on such beam to an extent establishing the bubble at the dial center. The collar 19 is now lifted to relieve the universal pivot of load. Without disturbing the swivel adjustment of the upper beam, the operator, after noting the reading on the scale $S_1$, shifts the weight 32 inward on such beam to establish the same reading on the scale $S_2$ as previously appeared on the scale $S_1$. Upon now again lowering the collar 19 and thus loading the universal pivot, the angular deflection of the carrier measures the amount and direction of work unbalance, and these may be read on the universal level. Any desired steps may be taken to correct work unbalance, after establishing the amount and direction of such unbalance.

In further explanation of the described method of eliminating inaccuracy due to carrier unbalance, we may identify the moments of unbalance of the work and carrier respectively as W and C, their aggregate unbalance being $W \pm C$. Outward shifting of the weight on the lower beam and swiveling of such beam compensate for this aggregate unbalance. Upon rotation of the work relative to the carrier through one hundred and eighty degrees, the weight on the lower beam still compensates for unbalance of the carrier, but the moment of work unbalance is doubled, becoming 2W. Hence shifting the upper weight inward one half of its distance from zero results in such tilting deflection as is solely due to work unbalance.

The marking of two scales on the upper beam is a time-saving provision for shifting the weight 32 inward from any position indicated on the scale $S_1$ exactly one half the distance of such position from zero of the two scales. Employment of the two scales moreover eliminates any necessity for calculating the required inward adjustment of said weight, thus minimizing the likelihood of inaccuracy. Since the weight 33 is required only to compensate for aggregate unbalance of the work and carrier, while the weight 32 must effect the same compensation plus that imposed by the weight 33, the latter weight requires only about one half the size of the weight 32.

That form of the invention appearing in Figs. 6, 7 and 8 primarily illustrates the feasibility of mounting the compensator at some axis on the carrier other than that at which the work is centered. As in the first-described construction an accurately vertical pin 37 is fixed on and upwardly projects from a base 38, to universally pivot a work carrier. Such carrier comprises a hollow hub 39 having a reduced upward extension 39a receiving the upper end of the pin, said extension rigidly carrying a lug 40 projecting into the pin to transmit the carrier load to a pivot-forming flexible wire 41 located at the pin axis and having its upper end fixed on the pin. Surmounting the extension 39a is a work-centering post 42, said extension forming a work seat. Laterally projecting from the hub is an elongated arm 43 which terminally mounts a universal level 44, and a counterbalancing arm 45 extends oppositely from the hub. A sheet metal plate 46 is bolted at 47 to the arm 43 and forms an outward extension from such arm, said plate having a reduced outer end welded to a cylindrical block 48. Threaded into such block and upstanding therefrom is a post 49 whereon upper and lower weighing beams 50 and 51 are swiveled, said post having an enlargement 52 serving as a spacer between the two beams. Said enlargement also permits the lower beam to be clamped against swivel movement in a tightened position of the post. Above the two beams, the post is formed with a head 53 by which it may be turned to effect clamping or unclamping of the lower beam. Weights 54 and 55 are slidable respectively on the upper and lower beams, each at one side of the post 49, and the beams are each weighted as indicated at 56 at the other side of said post, whereby the beams are balanced on the post, when the weights engage abutments formed by enlarged mid portions 57 of the beams. As in the first-described construction, the upper beam is marked with two scales S₁ and S₂, their numerical values being the same, but the units of the scale S₂ being one half the length of those of the scale S₁. Index marks 58 on the weight 54 are selectively registrable with the scale markings. A set screw 59 carried by the weight 54 terminally engages in an elongated slot 60 of the upper beam, assuring against rotation of such weight. Set into an arcuate groove interiorly formed in the weight 54 is an approximately U-shaped spring 61, having sufficient contractive force to resist accidental shifting of the weight.

The manner of use of the last-described compensator (Figs. 6, 7 and 8) duplicates that of the first-described construction, and hence is believed to require no further explanation.

Figs. 9 and 10 illustrate a modification adapted by use of a single weighing beam and a sliding weight thereon to compensate for inaccurate functioning of the carrier. Said modification conforms to that of Figs. 6, 7 and 8 in equipping the carrier with an arm 43' terminally mounting a universal level 44' and in rigidly attaching an outward extension 46' to the arm, such extension rigidly mounting a block 48'. Screwthreaded in and upstanding from said block is a post 62 whereon a weighing beam 51' is swiveled substantially midway of its length. Said post is headed at 62a above the beam and the latter may be clamped by the head 62a in any desired position of swivel adjustment by screwing the post sufficiently into the block 48'. A weight 55' is slidable on the beam to or from an abutting relation to an enlarged central portion 63 of the beam. When occupying such relation, the weighted portion of the beam is in accurate balance with the portion of the beam oppositely projecting from the post, the last-mentioned portion having a fixed inserted weight 64 to assure such balance. The concentric circular markings 65 of the level 44' are so spaced that outward travel of the bubble 66 of the level indicates one half of the actual unbalance corresponding to any angular deflection of the carrier on its universal pivot.

In using the compensator in its last-described form, a load is applied to the carrier while the universal pivot is relieved of stress. When such pivot is then allowed to function, the carrier tilts responsive to any unbalance of the work or carrier or both thereof. The operator now adjusts the weight 55' along the beam 51' and swivelly adjusts such beam until the bubble 66 of the level is centered relative to the dial markings 65. The beam is then clamped in its adjusted position. After now relieving the universal pivot from load, the work is rotated about its own axis upon the carrier through substantially one hundred and eighty degrees. Upon again allowing the universal pivot to function, the reading appearing on the level 44' is the unbalance of the work. This follows from the fact that the position of the weight 55' doubles such unbalance as characterizes the work, while the circular markings indicate one half of the unbalance inducing tilting of the carrier. Rotation of the work through one hundred and eighty degrees eliminates any error arising from inaccurate pivotal functioning of the carrier.

In any of its described forms, the compensator permits a material increase of accuracy in ascertaining the amount of work unbalance, and saves considerable time in the successive testing of work-pieces.

While a universal level of a bubble type is preferred as an indicator of the angular amount of carrier unbalance, the herein disclosed compensator is evidently applicable to machines employing some other type of unbalance indicator.

What I claim is:

1. In testing work mounted on a universally pivoted carrier and having an axis of required universal balance as to the amount and direction of unbalance of the work with respect to such axis, the method of compensating for error in functioning of the carrier, consisting in applying weight to the carrier in an amount and direction from the pivot such as to establish universal balance of the carrier and work, then rotating the work upon and relative to the carrier through substantially one hundred and eighty degrees about said axis, applying additional weight to the carrier in an amount and direction from said axis to overcome unbalance resulting from rotation of the work, and reducing the effective moment of the last-mentioned weight with respect to said axis by one half and thereby inducing pivotal response of the carrier and work solely to any unbalance of the work.

2. In testing work mounted on a universally pivoted carrier and having an axis of required universal balance as to the amount and direction of unbalance of the work with respect to such axis, the method of compensating for error in functioning of the carrier, consisting in adjusting a weight on the carrier radially to and circumferentially of said axis and thus establishing universal balance of the carrier and work, then rotating the work upon and relative to the carrier through substantially one hundred and eighty degrees about said axis, with resulting unbalance, then adjusting another weight on the carrier radially to and circumferentially of said axis to restore universal balance, and reducing the effective moment of the last-mentioned weight with respect to said axis by one half, and thereby inducing pivotal response of the carrier and work solely to any unbalance of the work.

3. In the method set forth in claim 2, the steps of relieving the universal pivot of load preliminary to the specified one hundred and eighty degree rotation of the work and reloading such pivot following such rotation.

4. In testing work mounted on a universally pivoted carrier and having an axis of required universal balance as to the amount and direction of unbalance of the work with respect to such axis, the method of compensating for error in functioning of the carrier, consisting in adjusting a weight on the carrier radially to and circumferentially of said axis and thus establishing universal balance of the carrier and work, then securing such weight from shifting circumferentially of said axis, then rotating the work upon and relative to the carrier through substantially one hundred and eighty degrees about said axis, with resulting unbalance, then adjusting another weight on the carrier radially to and circumferentially of said axis to restore universal balance, and reducing the effective moment of the last-mentioned weight with respect to said axis by one half, and thereby inducing pivotal response of the carrier and work solely to any unbalance of the work.

5. In a balance testing machine of the type comprising a work carrier, a support, a universal pivot mounting the carrier on the support, and means on the carrier for substantially centering work at an axis established by said pivot, the combination with the specified elements, of an arm fixed upon and having a substantially radial relation to the carrier, an elongated weighing beam, means swiveling such beam on the outer portion of said arm about an axis substantially parallel to said centering axis, a weight adjustable on and longitudinally of the beam, means for indicating carrier deflections about said pivot, graduated to indicate one half of any actual unbalance, and means operatively mounting such indicating means on said arm in proximity to said beam.

6. A balance testing machine as set forth in claim 5, said indicating means being a circular bubble level, having concentric circular markings so spaced that outward travel of the bubble indicates one half of the actual unbalance inducing any angular deflection of the carrier.

7. In a balance testing machine of the type comprising a work carrier, a support, a universal pivot mounting the carrier on the support, means on the carrier for substantially centering work at an axis established by said pivot, means for indicating carrier deflections about said pivot, and means operatively mounting the indicating means on the carrier the combination with the specified elements, of two weights independently adjustable on the carrier to and from and also circumferentially of said axis, means on the carrier independently limiting approach of the weights to said axis, and establishing balance of the carrier when both weights engage such limiting means, and means on the carrier for measuring the linear adjustment of one of said weights.

8. In a balance testing machine of the type comprising a work carrier, a support, a universal pivot mounting the carrier on the support, means on the carrier for substantially centering work at an axis established by said pivot, means for indicating carrier deflections about said pivot, and means operatively mounting such indicating means on the carrier, the combination with the specified elements, of two elongated weighing beams, a screw mounting said beams on the carrier to swivel about an axis substantially parallel to said centering axis, said screw being shouldered to clamp one of said beams against swivel travel, and a weight slidable on each beam.

9. In a balance testing machine of the type comprising a work carrier, a support, a universal pivot mounting the carrier on the support, means on the carrier for centering work substantially at an axis established by said pivot, means for indicating carrier deflections about said pivot, and means operatively mounting such indicating means on the carrier, the combination with the specified elements, of two elongated weighing beams, two weights respectively slidingly adjustable on the respective beams, a mounting on which said beams are coaxially swiveled about a common axis, and means for installing said mounting detachably on the carrier, with said swivel axis substantially vertical.

10. In a balance testing machine of the type comprising a work carrier, a support, a universal pivot mounting the carrier on the support, means on the carrier for substantially centering work at an axis established by said pivot, means for indicating carrier deflections about said pivot, and means operatively mounting the indicating means on the carrier, the combination with the specified elements, of two weights independently adjustable on the carrier to and from said axis, a pair of weighing beams respectively mounting the respective weights for sliding adjustment, means swiveling the beams on the carrier affording their independent angular adjustment about axes substantially parallel to said axis, and elements limiting adjustment of the weights toward the swivel axes and establishing balance of the carrier by cooperation with the weights when the weights engage such elements.

11. A balance testing machine as set forth in claim 10, said swivel axes being mutually aligned.

12. A balance testing machine as set forth in claim 10, one of said beams having graduations for measuring sliding adjustment of the corresponding weight.

13. A balance testing machine as set forth in claim 12, said swiveling means for the beams mounting them one above the other on aligned swivel axes, and said graduations being carried by the upper beam.

14. In a balance testing machine of the type comprising a work carrier, a support, a universal pivot mounting the carrier on the support, means on the carrier for substantially centering work at an axis established by said pivot, means for indicating carrier deflections about said pivot, and means operatively mounting the indicating means on the carrier, the combination with the specified elements, of an elongated weighing beam, means swiveling such beam on the carrier about an axis substantially parallel to said centering axis, a weight adjustable on and along the beam at one side of said swivel axis, the beam having two scales of graduations and associated linear values for measuring the weight adjustment and such scales having coincident zero points, the units of one scale being one half those of the other for the same indicated linear values, and a counterbalancing weight carried by the beam at the opposite side of its swivel axis.

References Cited in the file of this patent

UNITED STATES PATENTS

| | | |
|---|---|---|
| 995,109 | Bassett | June 13, 1911 |
| 1,701,464 | Kraft | Feb. 5, 1929 |
| 2,462,266 | Howard | Feb. 22, 1949 |
| 2,593,609 | Rhodes | Apr. 22, 1952 |
| 2,613,533 | Jones | Oct. 14, 1952 |